Patented Nov. 26, 1946

2,411,720

UNITED STATES PATENT OFFICE 2,411,720

INSECT REPELLENT

Samuel I. Gertler, Washington, D. C., assignor to the United States of America, as represented by the Secretary of Agriculture No Drawing. Application October 9, 1944, Serial No. 557,919

5 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to compositions for insect control and one of its objects is the utilization of pyrethrum marc, an abundant waste product, in such compositions.

Pyrethrum marc is a spent pyrethrum powder from which practically all the active principle or pyrethrins has been removed. The very small amount of active principle remaining in the spent pyrethrum is wholly ineffective as an insecticide.

According to this invention, when N,N-diethylpiperonylamide is uniformly incorporated into pyrethrum marc, which preferably has been diluted with a suitable diluent, or dusting powder, such as pyrophyllite, a composition which is remarkably effective in controlling insects, particularly, the Mexican bean beetle, is obtained. N,N-diethylpiperonylamide itself, is wholly inert against the larvae of the Mexican bean beetle.

A composition comprising 60 parts of pyrethrum marc, 38 parts of pyrophyllite, and 2 parts of N,N-diethylpiperonylamide is suitable for this purpose.

I have found that when this composition is dusted on the habitat of the insect, such as the foliage of bean plants upon which a number of larvae of the Mexican bean beetle are present, all these larvae are knocked to the ground within the first 24 hours and do not return to the leaves of the plant even if they succeed in surviving dehydration by the sun. In a large number of tests carried out for a period of 4 days, the leaves of such bean plants showed practically no damage. The initial effect of this composition seems to be paralytic, but thereafter it acts as a repellent.

In actual tests, it was found that none of the ingredients used alone gave any control. Mixtures of pyrethrum marc with pyrophyllite and mixtures of N,N-diethylpiperonylamide with pyrophyllite were also ineffective. However, when a composition containing both pyrethrum marc and N,N-diethylpiperonylamide was employed, definite control of the insects, as illustrated above, was obtained.

It is to be understood that other diluents and dusting powders, such as talc, bentonite and diatomaceous earth, may be used in place of the one already mentioned. Also, the proportions of the ingredients may be varied. No advantage, however, has been found in using more than 2% of N,N-diethylpiperonylamide.

Having thus described my invention, I claim:

1. An insect repellent comprising about 60 parts of pyrethrum marc and about 2 parts of N,N-diethylpiperonylamide.

2. An insect repellent comprising about 60 parts of pyrethrum marc, about 2 parts of N,N-diethylpiperonylamide, and a dusting powder.

3. A process of controlling insects comprising applying to the habitat of the insects an insect repellent composition containing about 60 parts of pyrethrum marc and about 2 parts of N,N-diethylpiperonylamide.

4. A process of controlling insects comprising applying to the habitat of the insects an insect repellent composition containing about 60 parts of pyrethrum marc, a dusting powder, and about 2 parts of N,N-diethylpiperonylamide.

5. A process of controlling the attack of the larvae and adult stages of the Mexican bean beetle on plants, comprising applying to the plants as a dust, an insect repellent composition comprising about 60 parts of pyrethrum marc, pyrophyllite and about 2 parts of N,N-diethylpiperonylamide.

SAMUEL I. GERTLER.